United States Patent
Hambleton et al.

(10) Patent No.: US 11,268,879 B2
(45) Date of Patent: *Mar. 8, 2022

(54) ADJUSTABLE LIQUID TRAP FOR LIQUID WASTE DRAINAGE UNDER DIFFERENTIAL PRESSURE CONDITIONS

(71) Applicant: WINFIELD SOLUTIONS, LLC, Arden Hills, MN (US)

(72) Inventors: William Hambleton, Hudson, WI (US); Daniel C. Bissell, Eagan, MN (US)

(73) Assignee: WinField Solutions LLC, Arden Hills, MN (US)

( * ) Notice: Subject to any disclaimer, the term of this patent is extended or adjusted under 35 U.S.C. 154(b) by 175 days.

This patent is subject to a terminal disclaimer.

(21) Appl. No.: 16/711,037

(22) Filed: Dec. 11, 2019

(65) Prior Publication Data

US 2020/0116587 A1    Apr. 16, 2020

Related U.S. Application Data

(63) Continuation of application No. 15/701,166, filed on Sep. 11, 2017, now Pat. No. 10,533,922.

(51) Int. Cl.
*G01M 9/04* (2006.01)

(52) U.S. Cl.
CPC .................................. *G01M 9/04* (2013.01)

(58) Field of Classification Search
CPC .......... G01M 9/04; G01M 15/14; G01M 9/06; G01M 9/08; G01M 5/0016; G01M 7/00; G01M 7/027; G01M 9/00; G01M 9/02; G01M 9/062; G01M 9/065; G01M 9/067

See application file for complete search history.

(56) References Cited

U.S. PATENT DOCUMENTS

| | | |
|---|---|---|
| 2,592,322 A | 4/1952 | Nerad |
| 3,111,842 A | 11/1963 | Fredette et al. |
| 3,456,503 A | 7/1969 | Wise |
| 3,552,202 A | 1/1971 | Kroeger et al. |
| 3,739,634 A | 6/1973 | Johnson et al. |
| 4,033,185 A | 7/1977 | Mcnally et al. |
| 4,648,267 A | 3/1987 | Seegmiller |
| 4,751,844 A | 6/1988 | Matsushita |
| 5,186,046 A | 2/1993 | Gouterman et al. |

(Continued)

FOREIGN PATENT DOCUMENTS

| | | | |
|---|---|---|---|
| CN | 110333043 B | * | 3/2021 |
| JP | H08122202 A | | 5/1996 |
| JP | H10185756 A | | 7/1998 |

OTHER PUBLICATIONS

"International Search Report and Written Opinion", Application No. PCT/US2018/050201, dated Dec. 30, 2018, 8 pages.

(Continued)

*Primary Examiner* — Andre J Allen
(74) *Attorney, Agent, or Firm* — Dorsey & Whitney LLP

(57) ABSTRACT

A wind tunnel device may include a waste disposal unit configured to collect fluid from a droplet extractor positioned in a wind tunnel. The waste disposal unit may include a drain line and a liquid trap integrated in the drain line. The liquid trap may be adjustable during operation of the wind tunnel to accommodate different tunnel operating conditions (e.g., wind speeds) such that liquid waste does not backflow into the wind tunnel.

20 Claims, 12 Drawing Sheets

(56) References Cited

U.S. PATENT DOCUMENTS

| | | |
|---|---|---|
| 5,942,682 A | 8/1999 | Ghetzler et al. |
| 6,155,111 A | 12/2000 | Wickern et al. |
| 6,357,473 B1 * | 3/2002 | Porter .................. F16K 15/144 |
| | | 137/512.15 |
| 6,997,049 B2 | 2/2006 | Lacey |
| 7,028,542 B2 | 4/2006 | Metni |
| 7,997,130 B1 | 8/2011 | Stonner et al. |
| 8,650,944 B2 | 2/2014 | Meis et al. |
| 8,656,769 B2 | 2/2014 | Moliere |
| 8,689,619 B2 | 4/2014 | Spandl et al. |
| 9,116,068 B2 | 8/2015 | Spandl et al. |
| 9,599,550 B2 | 3/2017 | Van Der Mark et al. |
| 9,816,895 B2 | 11/2017 | Sterling |
| 10,107,713 B2 | 10/2018 | Spandl et al. |
| 10,712,232 B2 * | 7/2020 | Hambleton .............. G01M 9/04 |
| 11,047,764 B2 * | 6/2021 | Hambleton .............. G01M 9/04 |
| 2002/0148507 A1 * | 10/2002 | Porter ..................... F16K 15/16 |
| | | 137/512.15 |
| 2005/0173561 A1 | 8/2005 | Cotter et al. |
| 2012/0060536 A1 | 3/2012 | Ahonen et al. |
| 2013/0180325 A1 | 7/2013 | Spandl et al. |
| 2015/0346052 A1 | 12/2015 | Spandl et al. |
| 2016/0245541 A1 | 8/2016 | Karamanos et al. |
| 2018/0171975 A1 * | 6/2018 | Rohm ....................... B64C 9/20 |
| 2019/0033165 A1 | 1/2019 | Spandl et al. |
| 2019/0078970 A1 | 3/2019 | Hambleton et al. |
| 2019/0078971 A1 | 3/2019 | Hambleton et al. |
| 2019/0271628 A1 | 9/2019 | Littley et al. |

OTHER PUBLICATIONS

Tomioka, et al., "Multipurpose wind tunnel facility", Translation of JPH0812222, Published May 1996. Translated Jun. 2019. (Year: 1996).

Guler, H. et al., "Wind Tunnel Evaluation of Drift Reduction Potential and Spray Characteristics with Drift Retardants at High Operating Pressure5", Journal of ASTM International, vol. 3 No. 5 Paper ID JAI13527; Online at www.astm.org, Feb. 17, 2006, pp. 1-9.

Reichard, D. L. et al., "Wind Tunnel Evaluation of a Computer Program to Model Spray Drift", Transactions of the ASAE, vol. 35(3), May 6, 1992, pp. 755-758.

UNC, "Applied Mathematics "The Fluid Lab at Applied Mathematics"", http://web.archive.org/web/20100612024021/http://wwamath.unc.edu/lab, (Accessed on Jun. 12, 2010), 1 pages.

UNC, "Applied Mathematics "Tunnel Picture"", http://www.amath.unc.edu/Faculty/rmm/tunnel.jpg, May 22, 1999, 1 page.

* cited by examiner

ADJUSTABLE LIQUID TRAP FOR LIQUID WASTE DRAINAGE UNDER DIFFERENTIAL PRESSURE CONDITIONS

CROSS-REFERENCES TO RELATED APPLICATION

This application is a continuation of U.S. patent application Ser. No. 15/701,166 filed Sep. 11, 2017, issued as U.S. Pat. No. 10,533,922 on Jan. 14, 2020, the entire contents of which are incorporated herein by reference and for all purposes.

TECHNOLOGICAL FIELD

This application relates to wind tunnel devices, and more particularly to an adjustable liquid trap for liquid waste drainage under differential pressure conditions.

BACKGROUND

Re-circulating spray wind tunnels typically use a droplet extractor to restrict droplets from re-circulating through the tunnel. The droplets extracted from the airflow by the droplet extractor typically are collected in a droplet extractor reservoir from which the collected droplets (i.e., liquid waste) are drained into a drain line, liquid trap, or waste container. However, the droplet extractor can cause issues with the flow of liquid waste out of the droplet extractor reservoir because of differential pressure between the wind tunnel and the drain line, liquid trap, or waste container. In some cases, the differential pressure can cause the liquid waste to not drain out of the droplet extractor reservoir, resulting in the liquid waste overflowing out of the reservoir and into the wind tunnel.

To accommodate for the differential pressure, some wind tunnel operators fix the drain line, liquid trap, or waste container at an orientation that is specific to the wind tunnel operating condition (e.g., wind speed). The orientation is set such that the liquid waste drains from the droplet extractor reservoir for the specific wind tunnel operating condition, and this set point is not changed during operation of the wind tunnel.

SUMMARY

In view of the foregoing, there is a need to provide a wind tunnel device that is adjustable for different tunnel operating conditions and allows complete drainage of a droplet extractor reservoir for the different tunnel operating conditions. The wind tunnel described herein includes an adjustable liquid trap. The adjustable liquid trap may prohibit backflow of liquid waste into the wind tunnel (e.g., a spray wind tunnel), regardless of the operating speed of the wind tunnel. Thus, the adjustable liquid trap may enable the wind tunnel to be operated at different wind speeds without concern of backflow of liquid waste into the wind tunnel.

The adjustable liquid trap may allow for precise adjustment of the liquid trap to facilitate drainage while preventing backflow, and for the option of complete drainage of the reservoir. In other words, the liquid trap may function to eliminate backflow from a waste holding container into a droplet extractor reservoir (e.g., a spray particle scrubber) for a given operating condition of the wind tunnel, and allow for complete drainage of the reservoir when the tunnel is not operating. The adjustable liquid trap may be applicable for users in atmospheric/sprays wind tunnel research, as well as generally for users in agriculture and industrial processing, among others.

According to one implementation, a wind tunnel device includes a waste disposal unit configured to collect fluid from a droplet extractor positioned in a wind tunnel. The waste disposal unit includes a drain line and a liquid trap integrated in the drain line. The liquid trap is adjustable during operation of the wind tunnel to accommodate different tunnel operating conditions.

According to another implementation, a method of disposing waste from a wind tunnel includes circulating air through the wind tunnel at a first wind speed, setting a liquid trap at a first height in response to the first wind speed to inhibit backflow of liquid waste into the wind tunnel at the first wind speed, adjusting the wind speed in the wind tunnel to a second wind speed that is different from the first wind speed, and adjusting the height of the liquid trap to a second height that is different from the first height in response to the second wind speed to inhibit backflow of liquid waste into the wind tunnel at the second wind speed.

In yet a further implementation, a wind tunnel device includes an extractor reservoir configured to collect fluid from a droplet extractor positioned in a wind tunnel, a waste container configured to collect liquid waste from the extractor reservoir, and a liquid trap fluidly connecting the extractor reservoir to the waste container. The liquid trap is adjustable during operation of the wind tunnel to enable drainage of the extractor reservoir and inhibit backflow of liquid waste from the waste container regardless of the operating speed of the wind tunnel.

DETAILED DESCRIPTION

Research has shown that the most reliable data for spray particle analysis comes from using a wind tunnel to move fine spray particles away from an analysis device to prevent duplicate measurements. This disclosure relates, in part, to low speed wind tunnels used for analysis of spray particle size.

Wind tunnel devices disclosed herein may provide for accurate laser analysis of spray particles, which may be used for: product development (such as spray tip development); formulation development (such as active ingredients, e.g., herbicides, and adjuvants, e.g., drift reducer compositions); product label development; drift reduction technology development (e.g., spray tips, active ingredients and adjuvants); and grower and applicator training and education. Wind tunnel devices may accordingly be configured to test a variety of herbicide active ingredients, adjuvants, spray tips, and combinations of these to evaluate potential off-target movement.

Figure 1:
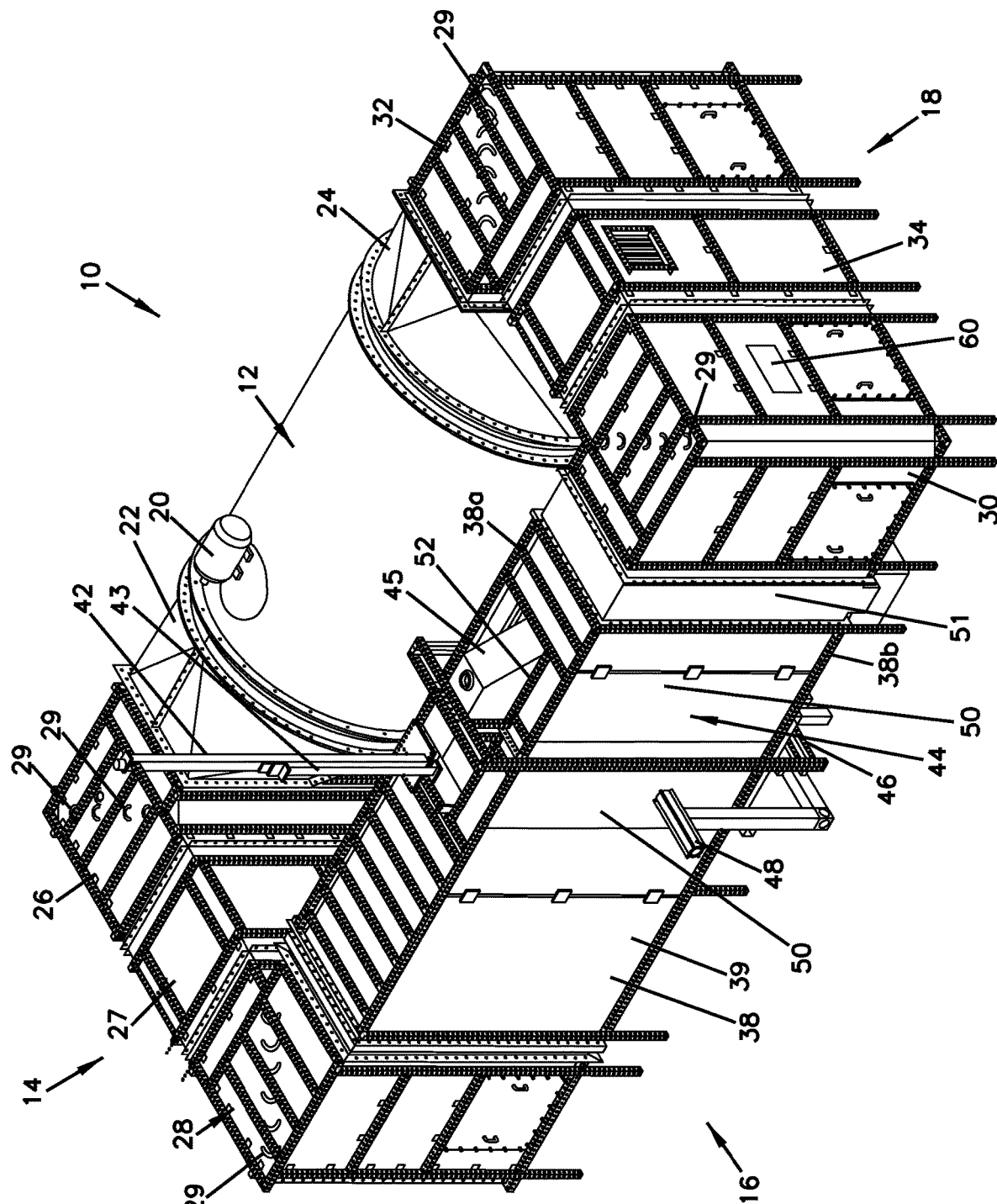
FIG. 1 is a perspective view of one embodiment of a wind tunnel device according to certain implementations.

FIG. 1 shows a perspective view of one embodiment of a wind tunnel device 10 according to certain implementations. The wind tunnel device 10 may include a series of segments or sections. Each of the sections may include a first end and a second end, such as a ceiling and a floor, respectively, as well as sidewalls therebetween. The sections may be generally rectangularly shaped and open at two sides to enable the sections to be interconnected. Some of the sections may be configured as corners and may include two open sides arranged at a right angle. For example, as shown in FIG. 1, the wind tunnel device 10 may include a fan 12, a first section 14, a second section 16, and a third section 18. The fan 12 and the three sections 14, 16, 18 may form a generally rectangular footprint for containing the airflow. A tunnel 19 may be defined within the volume enclosed within an interior defined by the fan 12 and the three sections 14, 16, and 18 of the wind tunnel device 10 and may enable airflow to pass therethrough. The tunnel 19 may be cyclical such that a volume of airflow moves from the fan 12 sequentially into the sections 14, 16, 18, and from section 18, the airflow may re-circulate back into the fan 12 without allowing the passage of particulates or airflow to the exterior of the device. Providing a cyclical circuit enables the airflow to be reused, which reduces the amount of air exiting the wind tunnel device 10 and minimizes particulate exposure. In some implementations, seals may be provided between the sections to further minimize the possibility that particulates or circulating airflow will be transported outside the wind tunnel device 10.

Figure 5:
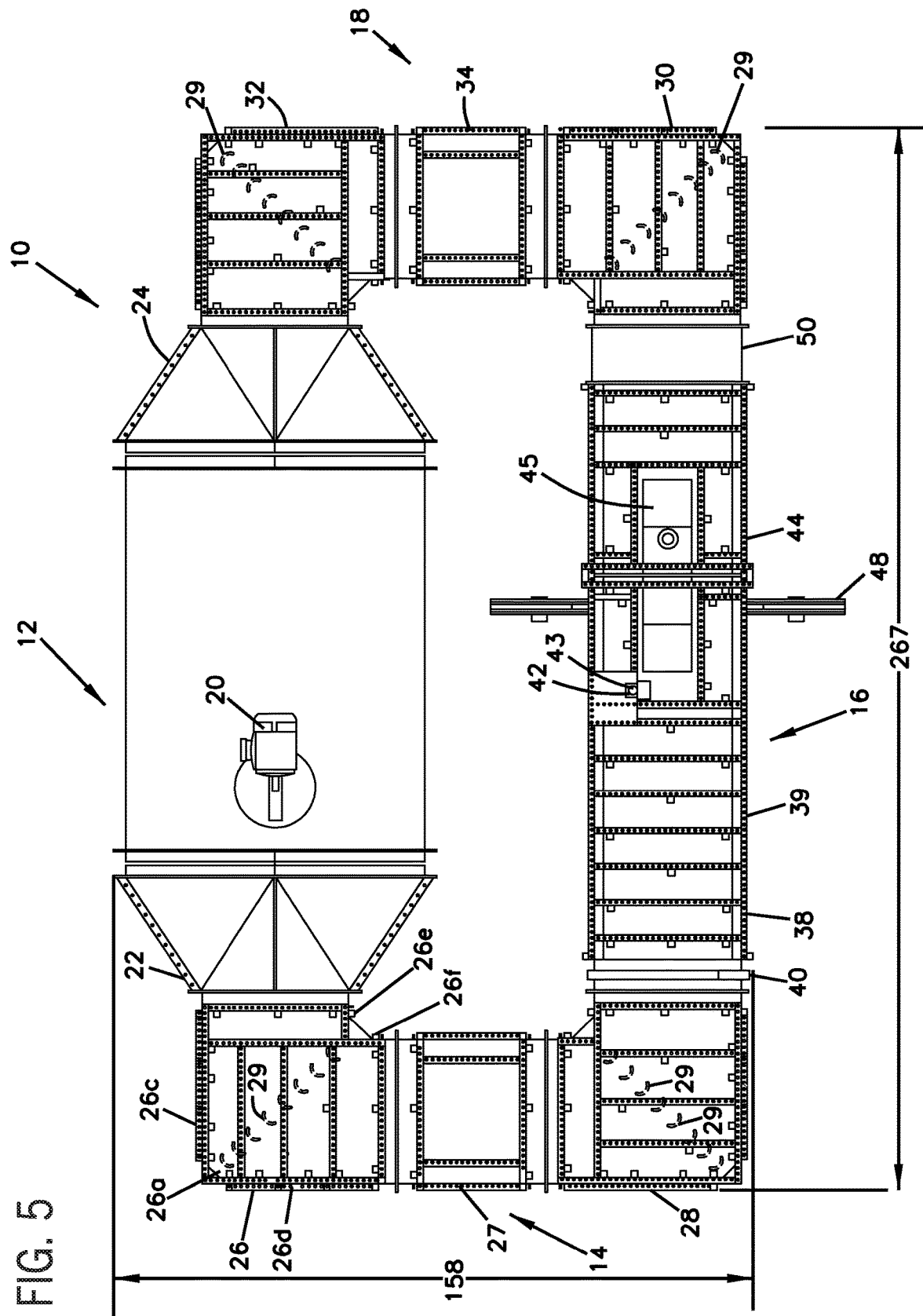
FIG. 5 is a top plan view of the wind tunnel device of FIG. 1.
Figure 7:
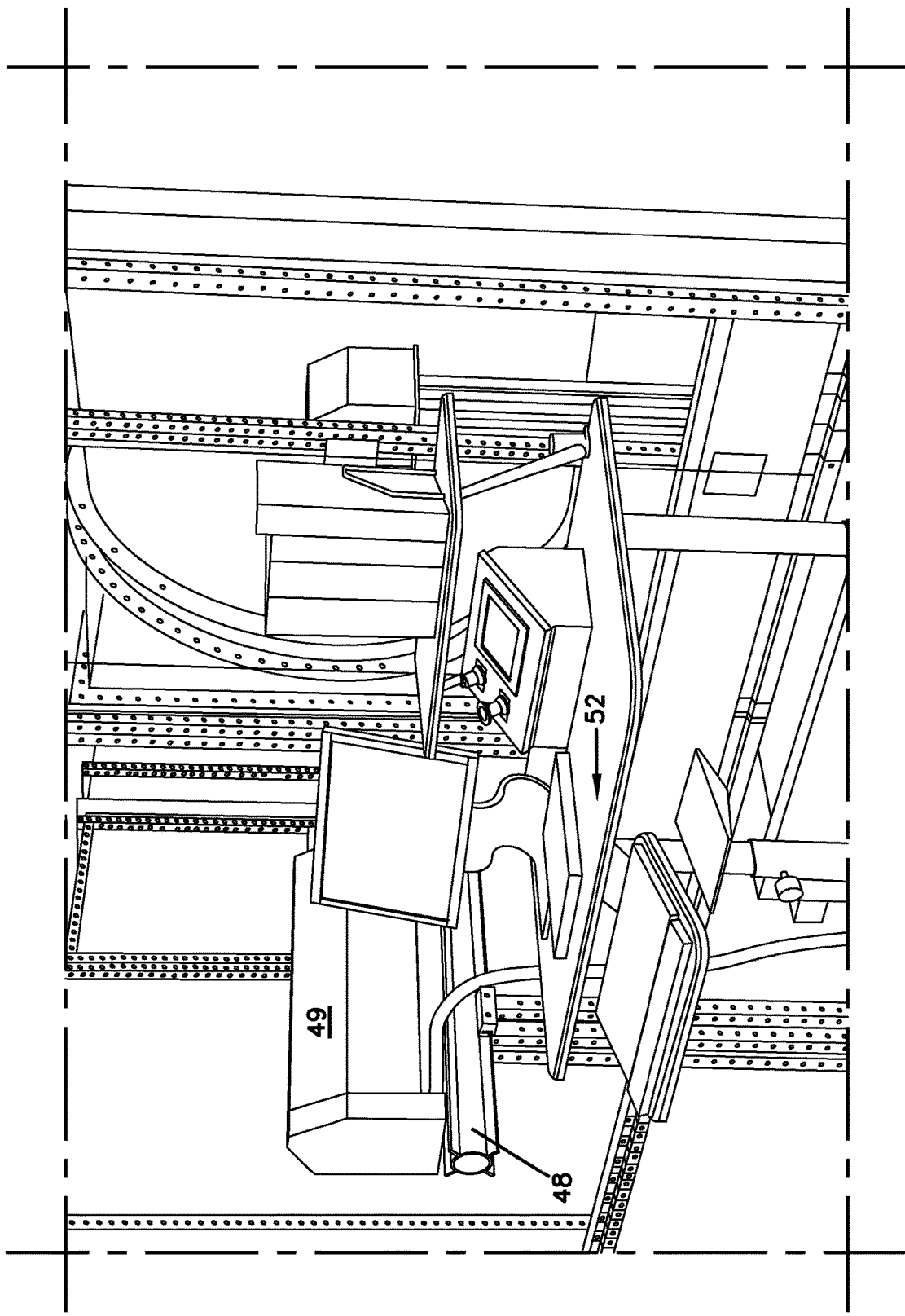
FIG. 7 is a view of an operating console that may be provided in connection with the wind tunnel device of FIG. 1.
Figure 8:
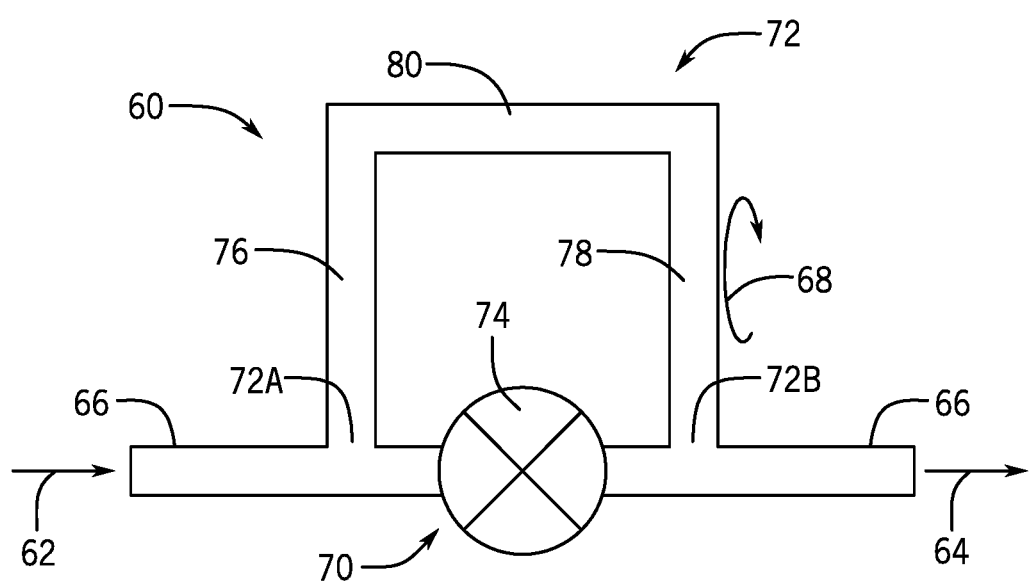
FIG. 8 is a schematic view of one embodiment of an adjustable liquid trap according to certain implementations.
Figure 9:
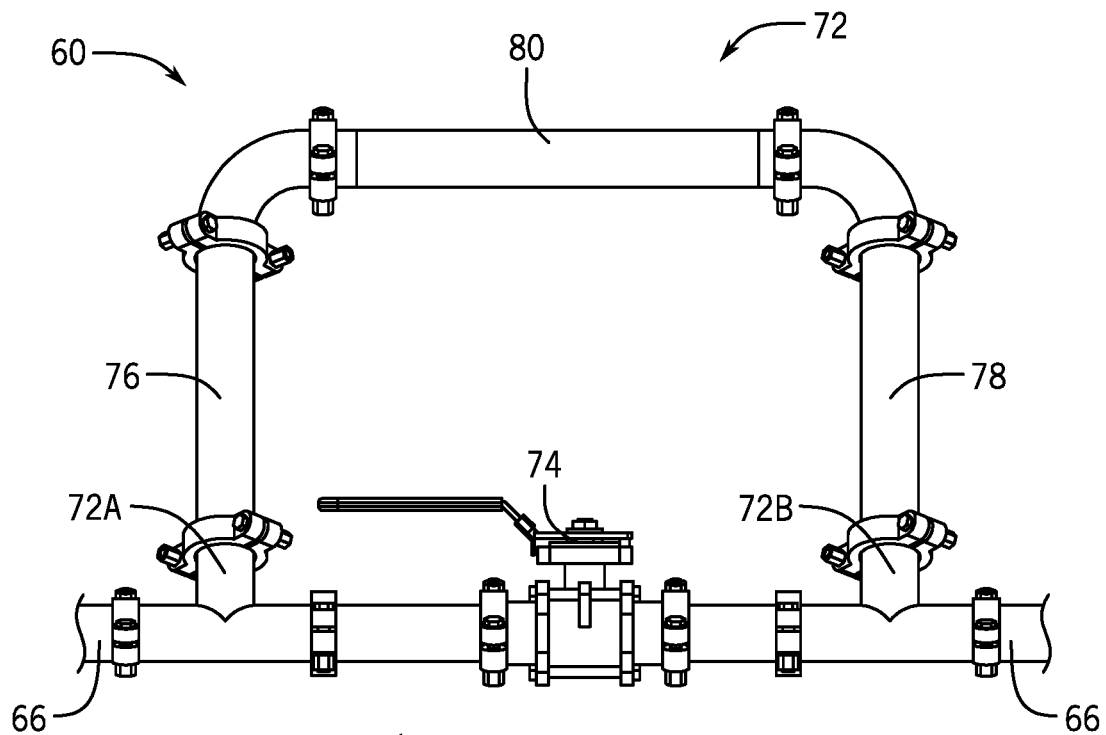
FIG. 9 is a more detailed view of the adjustable liquid trap of FIG. 8.
Figure 10:
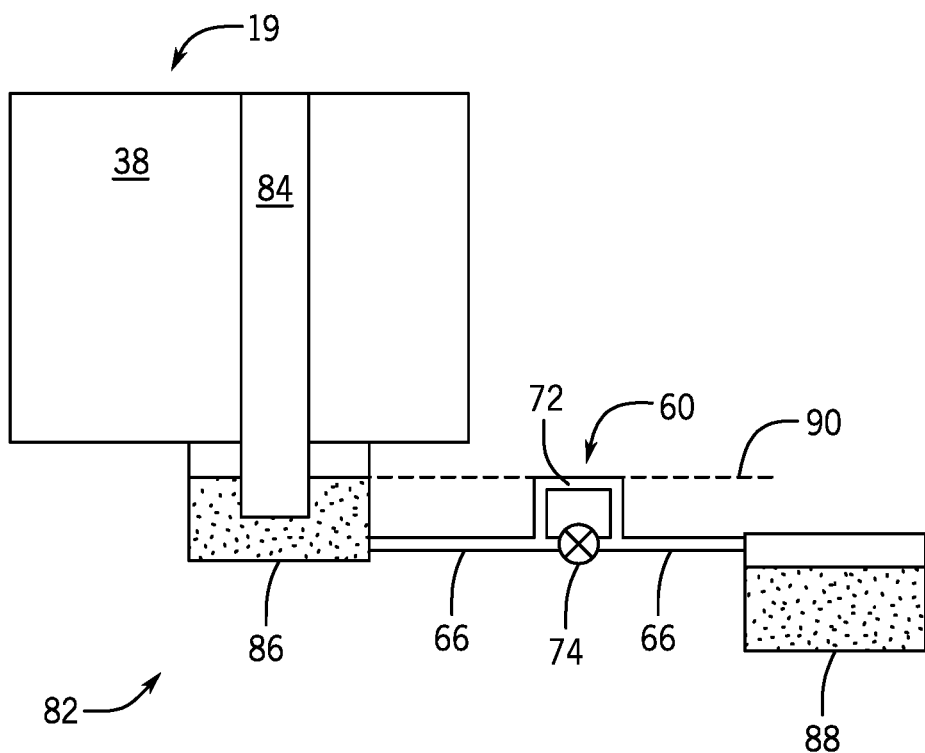
FIG. 10 is a schematic side view of one embodiment of a wind tunnel device including the adjustable liquid trap of FIG. 8 according to certain implementations.
Figure 11:
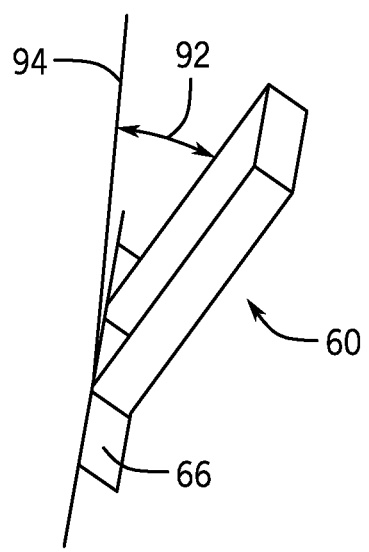
FIG. 11 is a detail of the adjustable liquid trap of FIG. 10.

The fan 12 of the wind tunnel device 10 may include a motor 20 configured to drive the fan 12, which may be communicatively coupled to a control system or an operating console of the wind tunnel device 10 (see FIG. 7). In a particular embodiment, the fan 12 is manufactured by Twin City Fan M/N (TSL SW Model 542), and is of the inline centrifugal type. As shown in FIGS. 1 and 5, the fan 12 may be joined to the first section 14 by a first duct 22 and to the third section 18 by a second duct 24. In one embodiment, the motor 20 is a 7.5 horsepower motor that may be configured to generate wind speeds of between about 1 and 20 miles per hour at a spray tip 25 (described below), or between about 1 and 14 miles per hour. Those skilled in the art will appreciate that a wide variety of commercially available fans with horsepower requirements ranging from 5 horsepower to 30 horsepower, or at about 5, 7.5, 10, 15, 20, 25, 30 horsepower may be used in connection with the wind tunnel device 10. Typically, the wind speed in the other portions of the flow circuit defined by the wind tunnel device 10 is equal to that of the test section, which is described further below in connection with the second section 12. However, in some implementations, flow may be expanded through a portion of the flow circuit and may be contracted through a duct or other air flow control device upstream from the test section.

Figure 2:
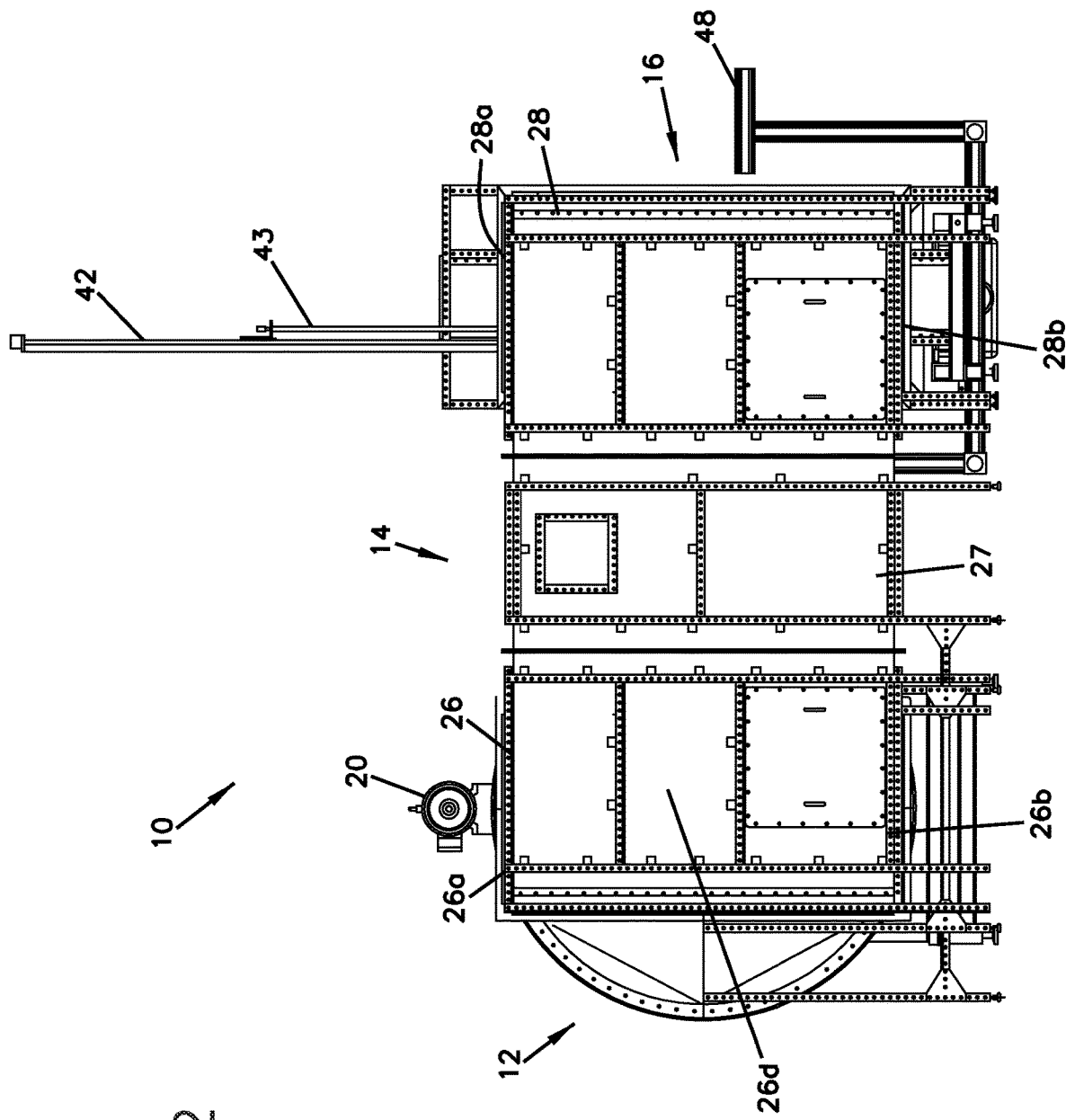
FIG. 2 is a left side view of the wind tunnel device of FIG. 1.

The first section 14 of the wind tunnel device 10 may include a first corner 26, a first middle section 27 and second corner 28. As shown in FIGS. 1, 2 and 5, the first corner 26 may be joined to the second corner 28 by way of the first middle section 27 and may form one side of the generally rectangular shape of the wind tunnel device 10. A portion of the tunnel 19 is formed within the volume enclosed by the first section 14. As shown in FIGS. 1, 2, 3 and 5, each corner 26, 28 is generally rectangular, may define a generally rectangular cross-section and may define openings at right angles relative to one another. As shown in FIG. 5, two adjacent sides of a corner 26, 28 form a generally right angled surface at the exterior of the wind tunnel device 10. In order to limit wind resistance due to such angles, each of the first and second corners 26 and 28 may include turning vanes 29 within an interior of the corners 26, 28. The turning vanes 29 may be configured as vertically extending members joined to top ends 26a, 28a and bottom ends 26b, 28b of the first and second corners 26 and 28, respectively. In some implementations, the turning vanes 29 may be configured as louvers or aerodynamic arc shaped vanes. In more specific implementations, the turning vanes 29 may be constant-area vanes (e.g., high efficiency profile (HEP) turning vanes manufactured by Aerodyne). Other turning vane geometries may include, but are not limited to, single thickness circular arc designs, multiple thickness circular arc designs, single thickness airfoil designs, and multiple thickness airfoil designs. In some implementations, the turning vanes 29 may be spaced intermittently along a diagonal line from the interior of the corner to the exterior of the corner 26, for example, extending between internal intersection points where the outside exterior walls 26c, 26d meet and at which internal exterior walls 26e, 26f meet. The turning vanes 29 may be configured to provide minimum loss and disturbance of air flow as the air turns the corner channels. That is, the turning vanes 29 may be placed at generally right angled surfaces within the corners 26, 28 to reduce wind resistance and direct airflow away from the right angled surfaces and some turning vanes 29 may be spaced apart within the corner 26, 28 to more evenly direct the airflow. In some implementations, airflow may be turned within the wind tunnel device without any turning vanes.

As shown in FIGS. 1, 3, 5 and 6, the second section 16 of the wind tunnel device 10 may be configured as a generally rectangular cabinet and may define the test section 38. The test section 38 may join to the second corner 28 of the first section 14 and to a first corner 30 of the third section 18. A portion of the tunnel 19 is formed within the volume enclosed by the test section 38.

The test section 38 of the second section 16 may generally define another side of the rectangular shape of the wind tunnel device 10. The rectangular test section 38 may be configured to include a first portion 39 with a honeycomb air stabilizer unit 40 (not shown), a traversing arm housing 42 with a traversing arm 43 holding the spray tip 25 (FIG. 6), a second portion 44 with a first expansion cutout 45, a second expansion cutout 46, a laser mount 48 that may hold a laser 49, glass wall sections 50 and a spray particle scrubber 51. The test section 38 may have an area that is 6 feet high by 3 feet wide by 12 feet long. In some implementations, the test section 38 may have various dimensions, and preferably the test section includes a length of at least 36 inches, and a width and a height that are at least one meter.

The first portion 39 of the test section 38 may be configured to accommodate movement of the traversing arm 43, described below. In addition, the first portion 39 may generally define a rectangular cross section with a ceiling at the upper end 38a of the test section 38, a floor at the lower end 38b of the test section 38, and a pair of opposing sidewalls arranged therebetween. In some implementations, glass wall sections 50 may be provided as the sidewalls of the first portion 39.

The honeycomb stabilizer unit 40 may generally be placed at the entrance to the test section 38. For example, the honeycomb stabilizer unit 40 may generally be positioned at the interface where the second corner 28 of the first portion 14 joins to the rectangular test section 38. The unit may include a honeycomb structure that allows air to pass through the structure, and may facilitate a more uniform and straight air flow from the second corner 28 into the test section 38. In one embodiment, the air stabilizer unit, or flow conditioner, may ensure both straightness and uniformity of the airflow as it passes the spray tip. The honeycomb stabilizer unit 40 may have a size and shape similar or the same as a cross-section of the wind tunnel, and may include a honeycomb structure with cells of various configurations. For example, a series of hexagonally-configured cells may each have dimensions of about 2 inches by about 0.25 inches. In addition to the hexagonal cell geometry, the cells may have square and round geometries, and may include cells sizes adapted for flow conditioning that may include a thicknesses likely ranging between 1" up to 4"×¼", ⅜", ½", ¾" and 1". Materials that may be used to fabricate the cells may include, but are not limited to, aluminum, polycarbonate, PVC, ABS, polypropylene, stainless steel, and titanium.

Figure 3:
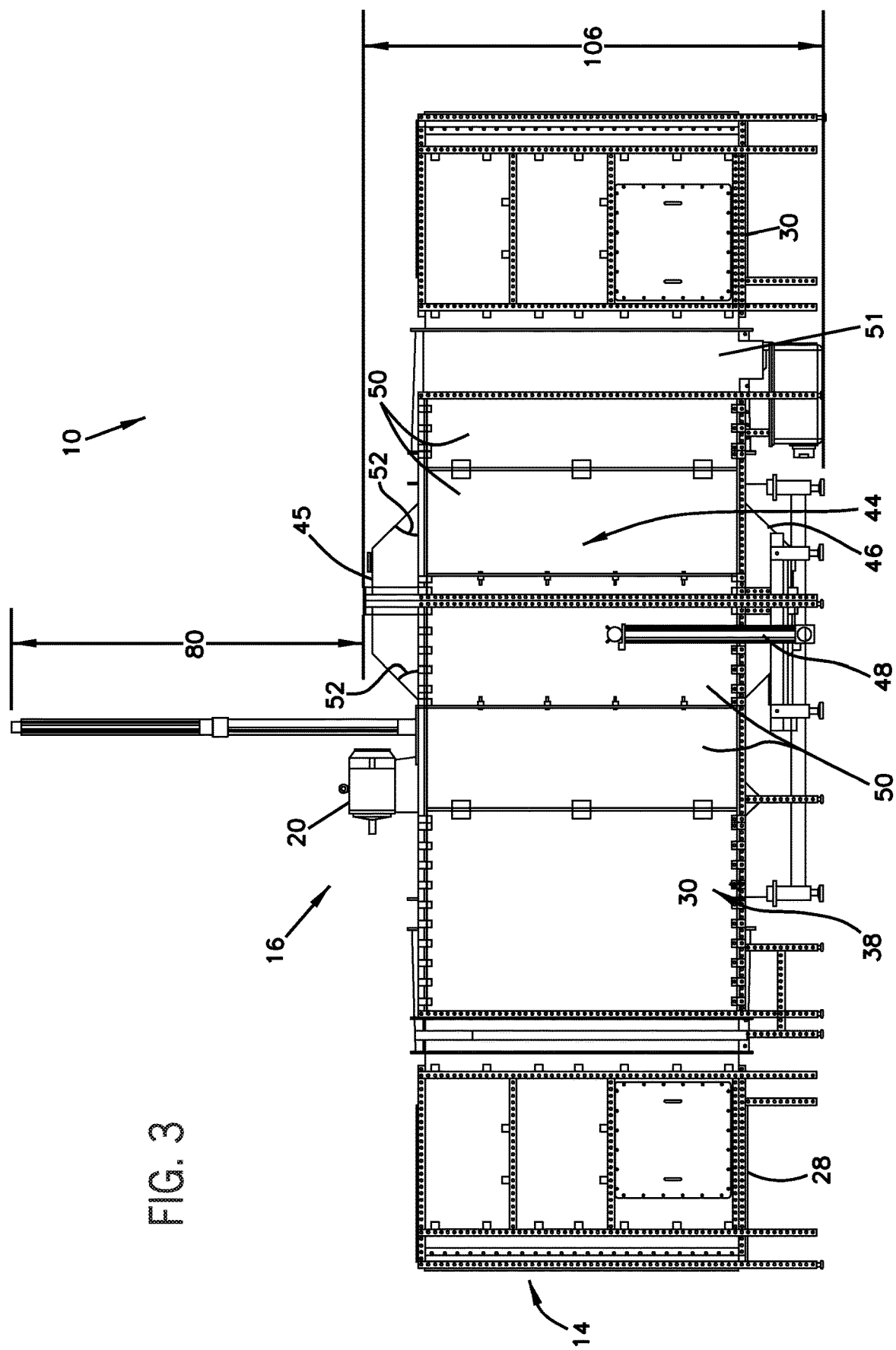
FIG. 3 is a front view of the wind tunnel device of FIG. 1.

The traversing arm housing 42 may be joined at the first portion 39 at a first end 38a of the test section 38, as shown in FIGS. 1 and 3. The traversing arm housing 42 may be configured to guide the traversing arm 43 into the space defined by the first portion 39 of the test section 38. In some implementations, the traversing arm housing 42 may include a track for guiding the traversing arm 43 and a seal arranged at an opening where the traversing arm 43 enters the test section 38. The seal between the housing 42 and the traversing arm 43 ensures spray particulates do not escape the test section during spraying and testing.

The traversing arm 43 may extend from the traversing arm housing 42 and may receive the spray tip 25. In some implementations, the spray tip 25 is offset from the traversing arm 43, for example by about 6 to 8 inches. In this example, the spray tip 25 may be coupled to the traversing arm 43 via a conduit such as a rigid conduit projecting horizontally from the traversing arm 43 and fluidly coupled to the spray tip 25. In further implementations, the traversing arm 43 or the conduit is adapted for the interchangeable attachment of spray tips and may include a supply line coupled to a fluid delivery system for delivering fluid to the one or more spray tips joined thereto. The spray tip 25 may be configured to emit a spray forming spray particulates, and the spray tip 25 may be selected from a variety of spray tips (e.g., nozzles) such as those used in agricultural applications.

The traversing arm 43 may be controllably lowered and raised between the first end 38a of the test section 38, which may be proximate a ceiling of the first portion 39 of the test section 38, and a second end 38b of the test section 38, which may be proximate a floor of the first portion 39. This movement may be through the use of a stepper motor (not shown), which moves the traversing arm 43 along the traversing arm housing 42.

Figure 6:
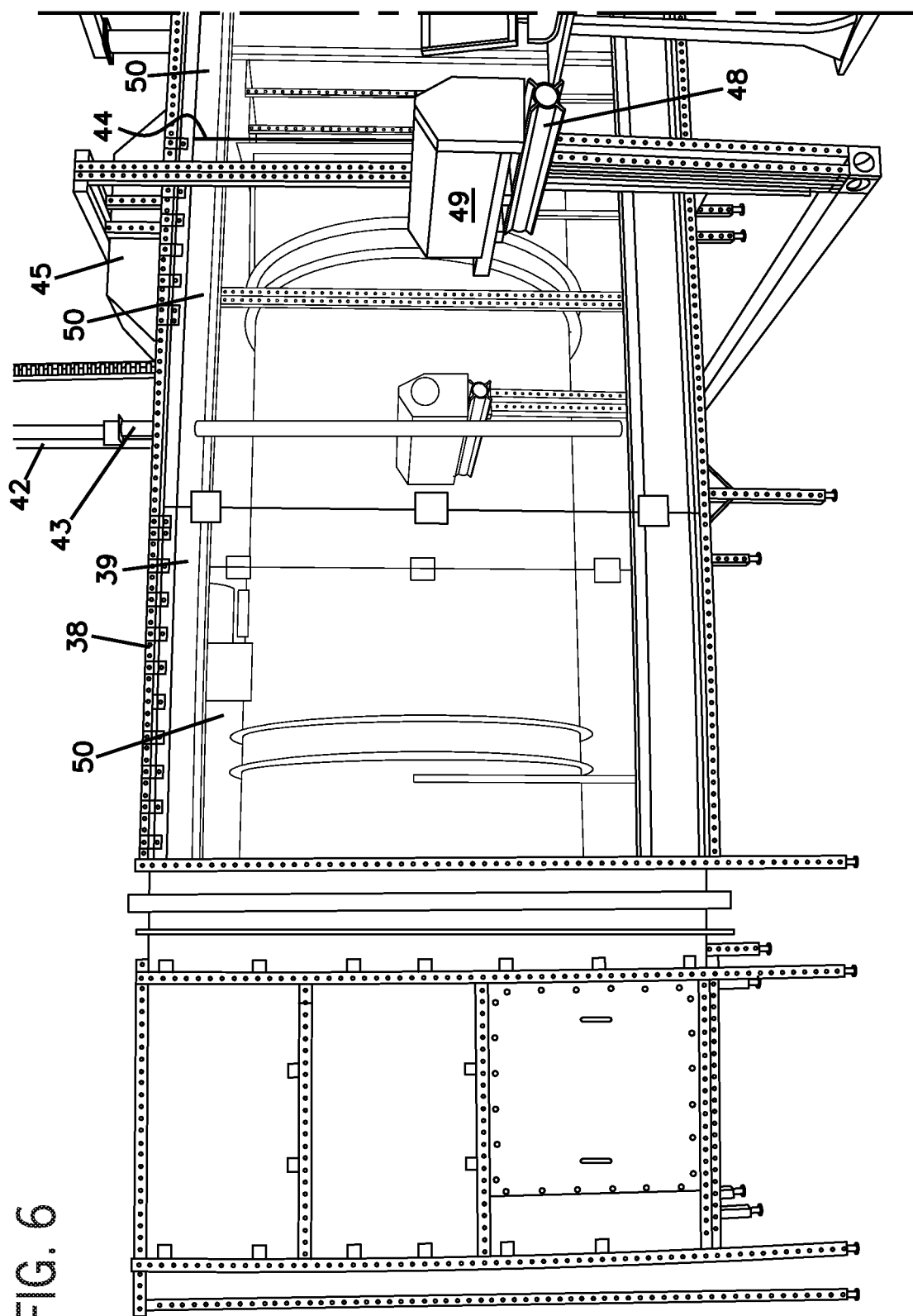
FIG. 6 is a front left side view of the wind tunnel device of FIG. 1.

In some implementations, the traversing arm 43 may be shaped similar to an airplane wing as shown in FIG. 6. For example, an airfoil shaped traversing arm 43 produced by Carlson Aircraft. Some suitable airfoil shapes for the arm 43 may be symmetrical circular arc shapes, symmetrical polynomial generated shapes, symmetrical matched ellipse shapes, and symmetrical NACA (National Advisory Committee for Aeronautics) airfoil shapes. The airfoil shape of the traversing arm 43 may provide less disruption to the air flow within the test section 38. However, other shapes may also be used for the traversing arm 43. In further implementations, the traversing arm housing 42 and traversing arm 43 may be fully enclosed within the test section 38. In this implementation, the traversing arm 43 may move along the traversing arm housing 42 within the test section 38, which may further minimize the possibility that particulates from the spray tip 25 will be transported outside the wind tunnel device 10.

The second portion 44 of the test section 38 may be configured as a fully enclosed testing region of the test section 38 where the spray particulates are analyzed. The second portion 44 includes a first expansion cutout 45 and a second expansion cutout 46 protruding outwardly from the first and second ends 38a, 38b of the test section 38 proximate a floor and a ceiling of the test section 38, respectively. The second portion 44 of the test section 38 with the expansion cutouts 45, 46 accordingly defines a space with cutouts forming an angled ceiling and an angled floor separated by sidewalls. The sidewalls of the second portion 44 may include the glass wall sections 50 in an area proximate where the spray analysis is conducted, described below. The configuration of the second portion 44 of the test section 38 accommodates the spray angles provided by the spray tip 25 joined to the traversing arm 43. In contrast, the space defined by the first portion 39 of the test section 38 may be unable to accommodate the spray angles provided by the spray tips 25 due to height limitations. For example, because the first portion 39 of the test section 38 is configured to allow the traversing arm 43 to translate between the first and second ends 38a, 38b of the test section 38, angled spray emitted from the spray tip 25 may otherwise contact the first and second ends 38a, 38b of the cabinet 30, e.g., the first portion 39 may define an area that is smaller than an area covered by the angled spray particulates. The expansion cutouts 45, 46 downstream from the spray tips 25 are configured to minimize such contact by the spray particulates.

The expansion cutouts 45, 46 may be configured as a five wall expansion piece with an opening for positioning over an opening in an upper or lower end 38a, 38b of the test section 38. Walls of the expansion cutouts 45, 46 include angled sides that define an expansion angle 52 that is approximately equal to the widest spray angle emitted by the spray tip 25 used in connection with the traversing arm 43. In some implementations the spray tip 25 may deliver a maximum spray angle of 140° and the expansion cutouts 45, 46 may be configured to accommodate this or other maximum spray angles. In some implementations, the expansion angle for the cutout may be about 45°. However, the expansion angle may vary from about 10° to about 90°. The depth of the expansion cutouts may be about 12 inches, and the size of the rectangles cut into the test section wall for receiving the expansion cutout may be about 12 wide by about 48 inches long. In some implementations, the cutouts 45, 46 may be configured with the same shape. The first expansion cutout 45 may include a drip tray that prevents any spray that impinges on the test section walls from dripping through the measurement area. The second expansion cutout 46 may include a drain for draining the collected liquid. In some implementations, the first expansion cutout 45 may define a small opening that may generally be capped, which may allow for a suction system to condition the flow past the first expansion cutout 45, for example.

The expansion cutouts 45 and 46 in combination with the second portion 44 of the test section 38 may be configured to allow the spray from wide and narrow angle spray tips 25 to be analyzed within the second portion 44 of the test section 38 without the spray bouncing off or collecting and dripping from the ceiling and the floor of the test section 38. For example, as a wide angle spray tip 25 is spraying a fluid (e.g., a herbicide) when it is at the top end 38a of the test section 38, the spray pattern of the herbicide may follow one or both of the angled expansion cutouts 45, 46 and the spray pattern may be allowed to flow along the expansion cutouts 45, 46 and the second portion 44 so that the spray pattern may be analyzed by the laser 48 and the particulates may exit the second portion 44. For example, the configuration of the expansion cutout 45 may prevent some droplets from forming on the ceiling of the first end 38a of the test section 38 above the space covered by the laser 49 by allowing the droplets to pass into and out of the expansion cutout 45. Similarly, the expansion cutout 46 may be configured at an angle at the second end 38b of the test section 38 to prevent splatter from the herbicide hitting the floor of the second end 38b of the test section 38 and enter the space covered by the laser 49 by allowing the droplets to pass into and out of the expansion cutout 46. The expansion cutouts 45, 46 may thus be configured to limit measurement errors due to errant drops (e.g., droplets that drip down from walls or bounce off of walls) passing through the laser path such as preventing fluid drops from forming as a result of hitting the ceiling or floor of the top and bottom ends 38a, 38b of the test section 38 and entering the space covered by the laser 49. Further, while some particulates may contact the drip tray of the first expansion cutout 45, the drip tray may prevent drop formation and channel the particulates downstream from the testing region thereby preventing such drops from falling in the space covered by the laser. Other particulates contacting the second expansion cutout 46 may be collected and drained.

The laser mount 48 of the test section 38 may be positioned proximate the second portion 44 of the test section 38 and may be configured to receive a laser 49 or other analysis devices. The laser mount 48 may be movable horizontally and/or vertically at least along the glass sections 50 of the second portion 44 to enable the laser 49 to measure spray particulates from various types of spray tips. For example, some spray tips 25 may deliver a sheet of liquid from an orifice and the sheet may break apart into spray particulates at a certain distance away from the orifice of the spray tips 25. In this example, the laser mount 48 and the laser 49 may be moved horizontally to a position along the second portion 44 corresponding to a location downstream from the nozzle where the spray particulates form. In some implementations, the laser mount 48 may translate horizontally from 0 to 24 inches from the spray tip, 2 to 18 inches from the spray tip or any combination thereof. In some implementations, the laser mount 48 may translate vertically while the spray tips remain stationary. While the analysis device described herein is a laser, it will be appreciated that other analysis devices may be used such as video imaging.

The glass sections 50 of the test section 38 may be configured to enable analysis, such as laser analysis, of the spray particulates without forming openings within the sidewalls of the test section 38. The glass used in the wind tunnel device 10 may be a ⅜" nominal thickness, low-iron, annealed, soda-lime glass. Acceptable glass configurations for the test section may include, but are not limited to, ¼" nominal thickness, ⅜" nominal thickness, and ¾" nominal thickness, and substantially equivalent metric sized materials. Acceptable compositions for the glass may include, but are not limited to, soda-lime, low-iron soda lime, and borosilicate. In some implementations, fused quartz and sapphire may be used in areas to where the laser analysis takes place. Low iron glass may be preferred due to its increased optical transmission. In addition, available tempers are annealed, strengthened, and tempered, but annealed glass is preferable due to its low optical distortion for the laser. Some installations may use tempered glass, for example, as a safety precaution. By analyzing the spray particulates within an environment separate from the user and from the analysis device, analysis may be performed by the user without risking exposure to potentially harmful chemicals and the analysis device remains free of spray particulates, which may facilitate avoiding inaccurate measurements. While providing glass sections 50 along sidewalls of the second portion 44 of the test section 38 is preferred, other areas of the test section 38 may also include glass sections. For example, as shown in FIG. 6, the first portion 39 of the test section 38 may include sidewalls formed of glass sections 50 such as optical glass walls configured to enable the user to view movement of the traversing arm 43. In some implementations, the glass sections 50 may be hinged to allow access to the interior of the test section 38, for example, to allow attachment of spray tips 25 and maintenance.

A spray particle scrubber 51 of the test section 38 may be joined between the second portion 44 of the test section 38 and the third corner 30 of the third section 18. In some implementations, the spray particle scrubber 51 may be configured to collect the droplets exiting the second portion 44 of the test section 38 and may prevent the droplets from continuing through the tunnel 19 defined by the wind tunnel device 10. With the use of a spray particle scrubber 51, the air may be reused and provided to the fan 12, for example. In one embodiment, the scrubber 51 may be configured as a mist extractor. In another embodiment, the scrubber 51 may be 99.7% effective at removing particles greater than 5 μm diameter. For example, the spray particle scrubber 51 may use a series of angled channels to change the flow path of the particles, allowing them to settle out and run down the channels, into the waste disposal unit.

As shown in FIG. 7, a computer 52 may be configured as an operating console for the wind tunnel device 10 and may be communicatively coupled thereto. The computer 52 may include a processor, a memory and a network connection. In some implementations, the computer 52 may be used to operate the traversing arm 43, the laser mount 48, the laser 49, a fluid delivery system for delivering fluid to the spray tips 25 and so on. For example, using the computer 52, an operator may adjust the position of the laser mount 48 and the laser 49 horizontally and vertically. This may protect the laser 49 from being handled while readjusting and repositioning the laser 49. In some implementations, the laser 49 may be operated using proprietary Sympatec software, WINDOX provided on the computer 52. In addition, the computer 52 may be configured to control the traversing arm 43 to lower and raise the spray tip 25 joined thereto. A traversing arm motor (not shown) may also be operated using software on the computer 52.

Figure 4:
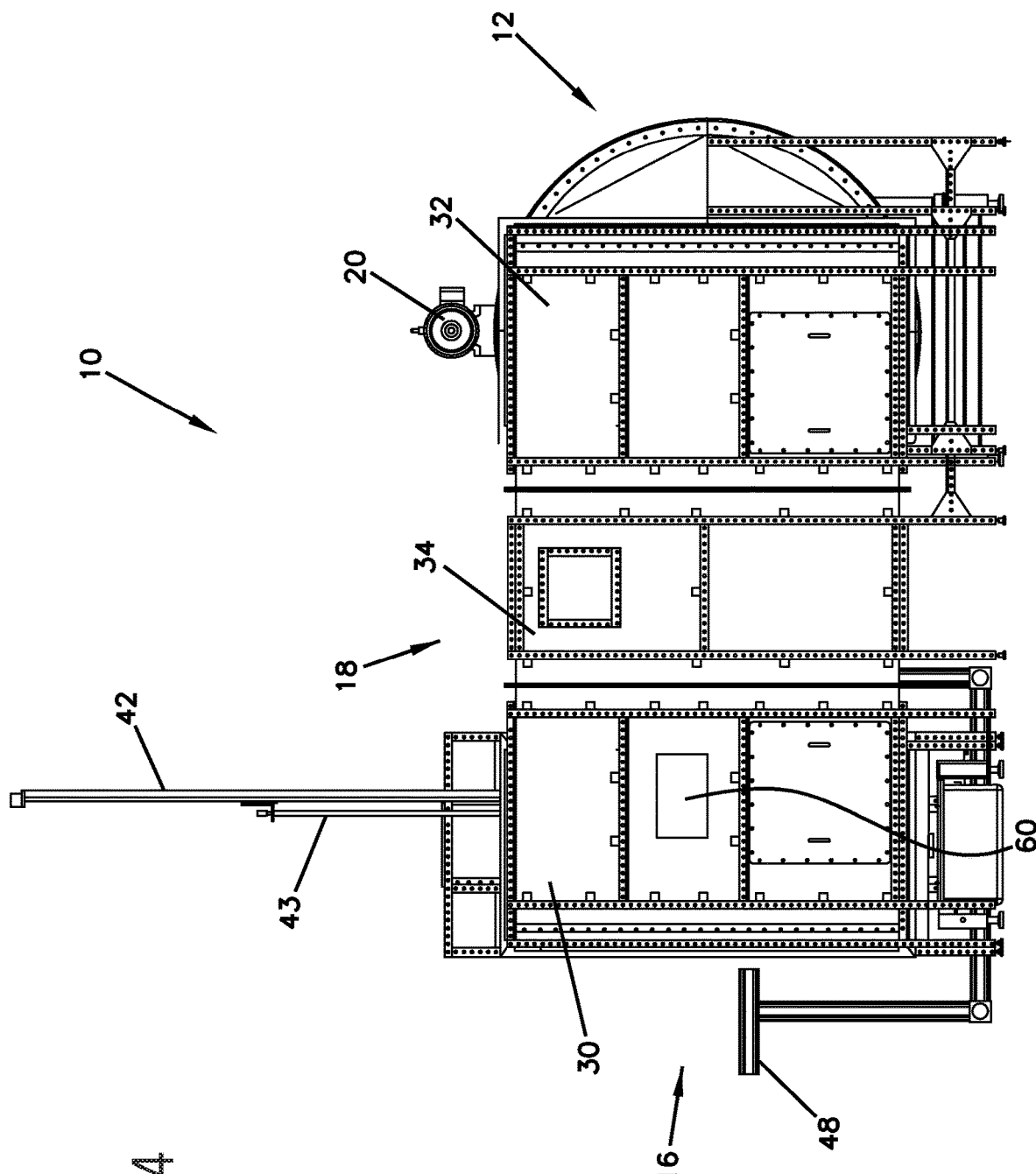
FIG. 4 is a right side view of the wind tunnel device of FIG. 1.

As shown in FIGS. 1 and 4, a control box 60 is mounted to the exterior of the wind tunnel device 10 and may be used to control the wind speed and a waste pump (not shown). The control box 60 may be operated using the computer 52 or may be operated separately therefrom.

As shown in FIGS. 1, 4 and 5, the third section 18 of the wind tunnel device 10 may include a third corner 30 and a fourth corner 32 connected by a second middle section 34. As shown in FIG. 5, the third corner 30, the fourth corner 32, and the second middle section 34 may define another side of the generally rectangular shape of the wind tunnel device 10. A portion of the tunnel 19 is formed within the volume enclosed by the third section 18. Similar to the first and second corners, each of the third and fourth corners 30 and 32 may include turning vanes 29. The third section 18 provides a connection between the fan 12 and the second section 16 to enable airflow to be re-circulated within the wind tunnel device 10. In some implementations, an exhaust system may be joined to the third section 18 to provide for safe removal of vapors or other contents in the airflow prior to re-circulating the airflow to the fan 12.

The wind tunnel device 10 disclosed herein provides several advantages over prior approaches. Because the device 10 is configured to re-circulate airflow, ambient air (e.g., air from an external environment in varying climates) need not be pumped into the device 10 from external sources, or at least a reduced amount of air is pumped into the device. For example, during summer and winter months when ambient temperatures are warm or cold, air within the device 10 may be reused, which avoid cooling and heating airflow prior to its introduction into the device 10. A further advantage provided by the device 10 is the ability to provide the laser in a separate environment from the interior of the device. This prevents the laser from fouling from spray particulates. In addition, because the laser may be mounted to the laser mount 48, the laser may be moved to multiple positions, which is in contrast to prior approaches in which lasers were statically mounted within a chemical hood. Yet another advantage provided by the device 10 is the ability to move the spray tip 25 within the device, including use of wide angle spray tips (110 to 140°) without fouling the test section. This differs from prior approaches in which the spray tip is mounted in one position, which may be problematic for leveling. Another advantage of the device is that the fully enclosed test chamber, facilitated by the optically clear glass, allows safe testing of active pesticide products.

Implementation of Use

In one implementation of use, the fan 12 may be operated by the motor 20 to force air through the tunnel 19 defined by the wind tunnel device 10. A spray tip 25 is attached to the traversing arm 43 of the test section 38. A conduit system adapted to transport fluids delivers fluid to the spray tip 25 to be sprayed therethrough. In some implementations, fluid may be forced to travel through the conduit system using an air compressor, pumps and so on. For example, the fluid to be delivered to the spray tip 25 may be tank mixed and pressurized within the tank, the conduit system or both. The conduit system may be coupled to a flow meter in order to measure the flow rate and pressure of the fluid passing therethrough prior to exiting the spray tip 25. In general, the spray tip 25 configuration determines the flow rate and the pressure of the exiting spray. The use of a flow meter provides confirmation that the fluid passing through the conduit system is moving properly, or so that any pressure drops may be accounted for when analyzing the spray exiting the spray tip 25. This enables the user to comply with ASAE/ANSI S572.1 test standard for quality control and size classification of agricultural nozzles, which may vary in quality when purchased from the manufacturer.

Using a computer 52, the traversing arm 43 is vertically lowered and raised within the first portion 39 of the test section 38 so that that spray tip 25 travels from the first end 38*a* of the test section 38 to the second end 38*b* of the test section 38. A fluid, such as an herbicide, is sprayed and the airflow passes the spray tip 25 at between 1 and 14 miles per hour. The spray tip 25 delivers spray at about a 110° spray angle, which may exit the spray tip in a vertical orientation. However, the spray angle delivered may exceed 140°, for example, depending on the spray tip and fluid sprayed therefrom.

The airflow carries spray particulates from the spray tip 25 into the second portion 44 of the test section 38 with the first and second expansion cutouts 45, 46. The expansion cutouts 45, 46 of the second portion 44 may substantially prevent droplets from forming on the ceiling above the space covered by the laser 49, and the expansion cutout 46 prevents droplets from bouncing off the floor and into the space covered by the laser 49. In some cases, the spray area may be larger than the second portion 44 of the test section 38 with the first and second expansion cutouts 45, 46, and may impinge upon the test section floor and ceiling but the particulates may be collected in a drip pan and channeled away from the test section. Prior to measurement of the spray particulates, the computer 52 is used to position the laser 49. The computer 52 is used to collect readings and determine particle size, which may then be analyzed. In some embodiments, the analysis may be used to classify the spray particle size as "Very Fine," "Fine," "Medium," "Coarse," and "Very Coarse."

The spray particulate measurements primarily may be taken while traversing the arm vertically up or down. Generally, for full-pattern analysis, the spray pattern measured during the run must clear the laser measurement area, prior to and after the run. The laser analysis may be triggered by the spray entering the test area and stopped when the spray exits the test area.

The spray can also be measured from a static position in a variety of orientations for other types of analysis. The wind tunnel device 10 provided herein is particularly useful for identifying spray particulates of various sizes, including particulates having a size limit of less than 150 μm and less than 105 μm.

The wind tunnel device 10 provided herein, with the laser mount 48 proximate the glass sections 50 of the second portion 44, along with the expansion cutouts 45, 46, may enable the device 10 to deliver airflow past the spray tip 25 at a speed of between about 1 and 14 miles per hour, which corresponds to low testing speeds. Using low testing speeds, the laser 49 may accurately detect the particle sizes of the spray particulates within the testing region.

In addition, the results of the laser 49 analysis may provide accurate results because the expansion cutouts 45, 46 may prevent errant drops from passing through the path of the laser, described above.

Providing glass sections 50 proximate the laser mount 48 enables the laser 49 to analyze the spray particulates without the particulates contacting the laser 49. Users of the wind tunnel device 10 are also protected from exposure to the spray particulates due to the enclosed space formed by the series of joined segments forming the wind tunnel device 10.

The cyclical or rectangular shape of the wind tunnel device 10 further provides a system that re-circulates airflow, as described above. The re-circulated airflow entering the fan 12 may be clean using the spray particle scrubber 51 positioned downstream from the testing region 44 and upstream from the fan 12.

Adjustable Liquid Trap

Figure 12:
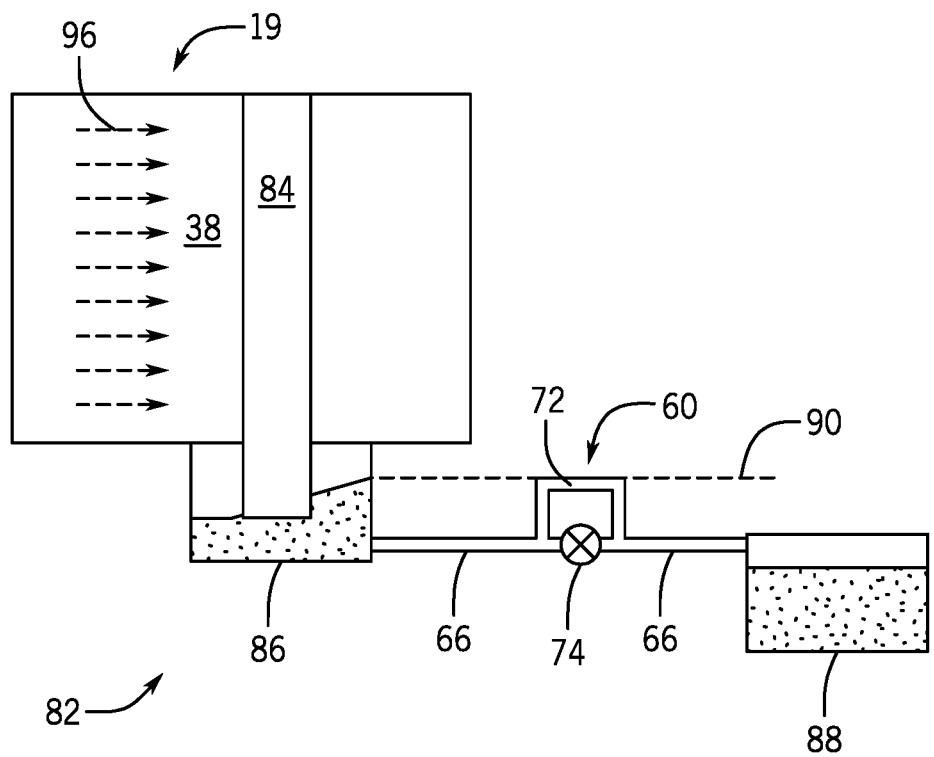
FIG. 12 is a schematic side view of the wind tunnel device of FIG. 10 during a first operating condition (e.g., wind speed).
Figure 13:
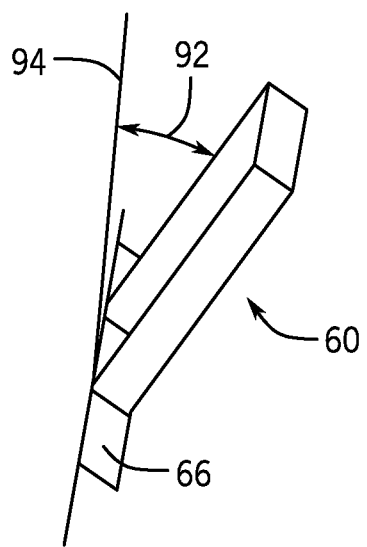
FIG. 13 is a detail of the adjustable liquid trap of FIG. 12.

Recirculating wind tunnels, such as spray wind tunnels, typically include a droplet eliminator or extractor (referenced herein as "droplet extractor" for the sake of simplicity and without intent to limit) to keep droplets from recirculating. However, the droplet extractor can cause issues with the flow of liquid waste. For example, the droplet extractor can cause a differential pressure across the droplet extractor, which can cause liquid waste to backflow into the wind tunnel from a waste disposal unit. The droplet extractor may be formed as the spray particle scrubber 51 illustrated in FIG. 1.

Referring to FIG. 8, the wind tunnel device 10 (see FIGS. 1-7) may include an adjustable liquid trap 60 that inhibits the backflow of fluid into the tunnel, regardless of the operating speed of the wind tunnel. Adjustment of the liquid trap 60 may enable drainage of fluid while preventing backflow.

The adjustable liquid trap 60 may receive fluid from an extractor reservoir (represented by arrow 62 in FIG. 8) and route the fluid to a waste container (represented by arrow 64 in FIG. 8). In other words, the fluid may flow through the liquid trap 60 from the extractor reservoir to the waste container. To accommodate for changes in differential pressure in the wind tunnel, the liquid trap 60 may be height adjustable. For example, the liquid trap 60 may be rotatable relative to a drain line 66 that fluidly couples the liquid trap 60 to the extractor reservoir and the waste container. By rotating the liquid trap 60 relative to the drain line 66 (see, e.g., rotation arrow 68 in FIG. 8), the height of the liquid trap 60 relative to the drain line 66 may be adjusted. For example, to increase the height of the liquid trap 60, the liquid trap 60 may be rotated into a more upright position. In contrast, to decrease the height of the liquid trap 60, the liquid trap 60 may be rotated into a less upright position. By rotating the liquid trap 60, the trap 60 can enable drainage of the extractor reservoir but prevent backflow from the waste container.

Referring to FIGS. 8 and 9, the liquid trap 60 may include a bypass portion 70 that is in-line with the drain line 66, and a trap portion 72 that includes ends 72A, 72B fluidly connected with the bypass portion 70. The bypass portion 70 and the trap portion 72 may include various sections of tubing, which may be coupled together with various types of fittings, for example.

The bypass portion 70 may be configured to drain the extractor reservoir into the waste container when the wind tunnel is not operating, for example. In certain circumstances, the user may completely drain the reservoir via the bypass portion 70. As illustrated in FIGS. 8 and 9, the bypass portion 70 may include a valve 74. The valve 74 may be movable between a closed position (see FIG. 8) in which fluid is directed through the trap portion 72 of the liquid trap 60 and an open position (see FIG. 9) in which fluid flows through the bypass portion 70 of the liquid trap 60. In the open position, the valve 74 allows the liquid trap 60 to completely drain the extractor reservoir into the waste container.

With continued reference to FIGS. 8 and 9, the trap portion 72 of the liquid trap 60 may be U-shaped. The trap portion 72 may include a first section 76, a second section 78, and a third section 80. The first section 76 may be fluidly connected with the bypass portion 70 at the first end 72A of the trap portion 72, and the second section 78 may be fluidly connected with the bypass portion 70 at the second end 72B of the trap portion 72. The first section 76 and the second section 78 may extend substantially orthogonal to the bypass portion 70, and the second section 78 may be offset from the first section 76 along a length of the bypass portion 70. The third section 80 may fluidly interconnect the first section 76 and the second section 78, and the third section 80 may extend substantially parallel to the bypass portion 70. By rotating the trap portion 72 about a longitudinal axis of the drain line 66, the height of the third section 80 of the trap portion 72 is varied. By varying the height of the third section 80, the trap portion 70 can be adjusted to accommodate different operating conditions of the wind tunnel, such as different wind speeds of the wind tunnel.

Referring to FIGS. 10, 12, 14, and 16, the adjustable liquid trap 60 may form part of a waste disposal unit 82 configured to collect fluid (such as liquid waste) from a droplet extractor 84 positioned in the wind tunnel 19, such as a test section 38 of the wind tunnel 19. The waste disposal unit 82 may include the drain line 66 and the liquid trap 60 may be integrated into the drain line 66. The waste disposal unit 82 may include a droplet extractor reservoir 86 configured to collect fluid from the droplet extractor 84, and a waste container 88 (such as a liquid waste holding container) configured to collect fluid from the extractor reservoir 86 after the fluid passes through the liquid trap 60. The drain line 66 may fluidly interconnect the extractor reservoir 86 and the waste container 88. The drain line 66 may be connected to the extractor reservoir 86 near a bottom of the extractor reservoir 86 and may be connected to the waste container 88 near a top of the waste container 88 to enable complete drainage of the extractor reservoir 86 into the waste container 88.

Referring to FIG. 10, the waste disposal unit 82 is illustrated in an example equilibrium state in which the tunnel 19 is not operating. In FIG. 10, the liquid trap 60 is adjusted such that the height of the liquid trap 60 corresponds to a desired fluid level in the droplet extractor reservoir 86. The valve 74 in the liquid trap 60 is closed, and thus the fluid in the extractor reservoir 86 has to flow through the trap portion 72 of the liquid trap 60. The fluid in the extractor reservoir 86 drains through the liquid trap 60 into the waste container 88 until the fluid level (represented by the dashed line 90 in FIG. 10) in the extractor reservoir 86 corresponds to the height of the trap portion 72 of the liquid trap 60, as illustrated in FIG. 10. As illustrated in FIG. 11, the height of the liquid trap 60 may be adjusted by rotating the liquid trap 60 about the drain line 66 to thereby set the desired fluid level in the droplet extractor reservoir 86. The height of the trap 60 may be increased by positioning the trap 60 in a more upright position (e.g., by decreasing the angle 92 between the trap 60 and a vertical plane 94), and may be decreased by positioning the trap 60 in a less upright position (e.g., by increasing the angle 92 between the trap 60 and the vertical plane 94). By adjusting the angle 92 of the trap 60, an adjustable drain path is provided that allows drainage from the extractor reservoir 86 to the waste container 88, but inhibits reverse fluid flow from the waste container 88 to the extractor reservoir 86.

Referring to FIG. 12, when the wind tunnel is operating, air flow (represented by arrows 96) flows through the extractor 84 and creates a pressure differential across the mist extractor 84. The pressure differential causes the fluid level to vary across the extractor reservoir 86. For example, as illustrated in FIG. 12, the fluid level may increase in the reservoir 86 from an upstream side of the extractor 84 to a downstream side of the extractor 84. The varied fluid level in the reservoir 86 may be caused by a higher pressure upstream of the extractor 84 (e.g., on the test section 38 side of the extractor 84) and a lower pressure downstream of the extractor 84. By rotating the liquid trap 60, the height of the trap 60 can be adjusted to ensure the fluid level (represented by dashed line 90 in FIG. 12) does not overflow into the tunnel 19. As illustrated in FIG. 13, the liquid trap 60 is positioned at a particular angle 92 relative to vertical plane 94 such that the height of the liquid trap 60 corresponds to the height of fluid in the reservoir 86.

Figure 14:
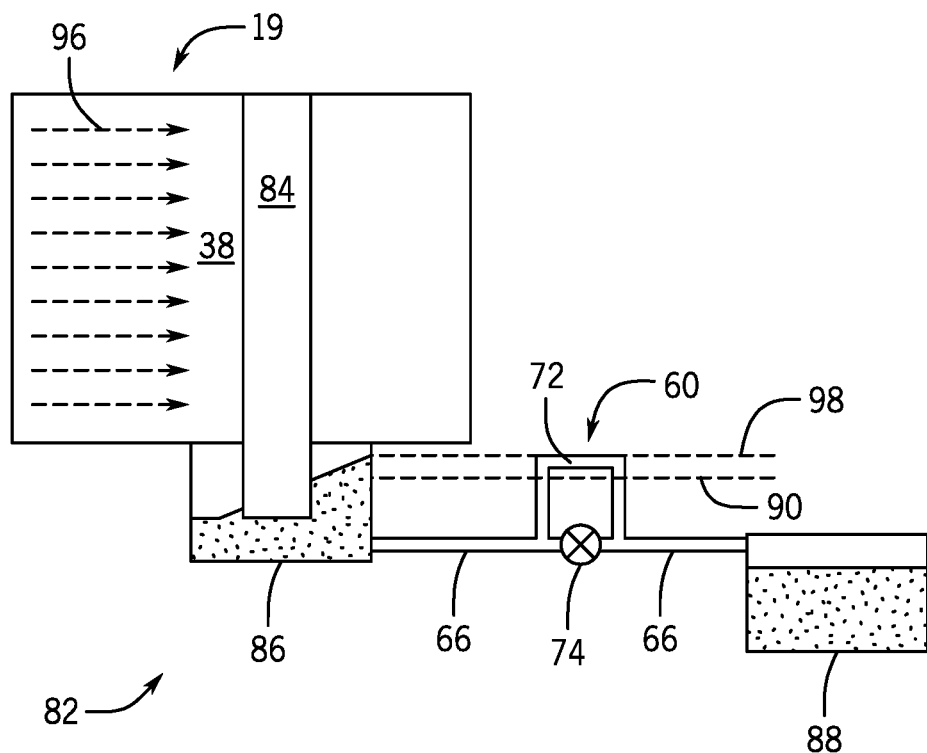
FIG. 14 is a schematic side view of the wind tunnel device of FIG. 10 during a second operating condition (e.g., wind speed).
Figure 15:
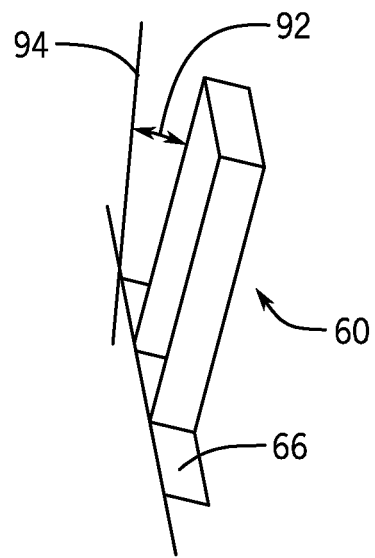
FIG. 15 is a detail of the adjustable liquid trap of FIG. 14.

The fluid level in the extractor reservoir 86 may change with the wind speed, and in response the effective height of the liquid trap 60 can be adjusted to ensure the fluid in the reservoir 86 does not overflow into the wind tunnel 19. Referring to FIG. 14, the wind speed in the wind tunnel 19 is increased relative to the wind speed in FIG. 12 (wind speed is represented by the relative lengths of arrows 96 in FIGS. 12 and 14). As illustrated in FIG. 14, the increased wind speed created a larger pressure differential across the extractor 84, thereby causing the fluid level in the reservoir 86 on a downstream side of the extractor 84 to increase relative to the fluid level in FIG. 12. As illustrated in FIG. 14, by rotating the liquid trap 60 about the drain line 66, the height of the trap 60 can be increased (represented by dashed line 98 in FIG. 14) to correspond to the fluid level in the reservoir 86. As illustrated in FIG. 14, the angle 92 of the liquid trap 60 relative to vertical plane 94 is less than the angle 92 in FIG. 12. In other words, the liquid trap 60 is more upright in FIG. 14 than in FIG. 12 in response to the increase in wind speed in the tunnel 19. The maximum height of the liquid trap 60 may be configured to ensure the fluid level in the reservoir 86 does not overflow into the wind tunnel 19. For example, the maximum height of the liquid trap 60 may be dimensioned so that the trap portion 2 of the liquid trap 60 is below the upper edge of the extractor reservoir 86 even if the liquid trap 60 is oriented vertically in plane with vertical plane 94.

As described, the liquid trap 60 may be adjustable relative to the drain line 66 during operation of the wind tunnel 19 to accommodate different tunnel operating conditions. For example, as illustrated in FIGS. 12-15, the liquid trap 60 may be rotated relative to the drain line 66 to adjust the effective height of the liquid trap 60 to correspond to the respective tunnel operating condition. The liquid trap 60 may be rotated into a more upright position in response to an increase in wind speed in the wind tunnel 19, and the liquid trap 60 may be rotated into a less upright position in response to a decrease in the wind speed in the wind tunnel 19.

Without the liquid trap 60, the pressure differential caused by the droplet extractor 84 may cause the fluid in the extractor reservoir 86 to spill over the edges of the reservoir 86 into the wind tunnel 19. As previously described, the height of the liquid trap 60 may be adjusted via rotation such that the extractor reservoir 86 can drain properly without overflowing into the wind tunnel 19. The liquid trap 60 also may inhibit the fluid from flowing back into the reservoir 86 from the waste container 88. The bottom of the liquid trap 60 may include the valve 74 so the extractor reservoir 86 can be completely drained. The adjustable liquid trap 60 may minimize the amount of waste fluid stored in the trap 60 while simultaneously providing sufficient storage so that the extractor reservoir 86 functions properly during tunnel operation, and fluid in the reservoir 86 does not overflow into the tunnel.

In some implementations, the liquid trap 60 is adjusted automatically during operation of the wind tunnel 19. For example, the waste disposal unit 82 may include a feedback system including a fluid level indicator or sensor on the downstream side of the extractor reservoir 86, and an actuator that is operable to change the angle of the liquid trap 60 in response to changes in the fluid level detected by the indicator or sensor. As the fluid level increases in the extractor reservoir 86, the actuator in response rotates the liquid trap 60 more vertically.

Alternatively, the liquid trap 60 can be manually rotated by an operator of the wind tunnel. For example, the operator may monitor the fluid level inside the reservoir 86 and manually adjust the liquid trap 60 to the corresponding height. In other words, the operator may monitor the fluid level during operation of the wind tunnel, and the operator may adjust the height of the liquid trap 60 in real time in response to the fluid level raising or lowering in the extractor reservoir 86. Stated differently, the adjustment of the height of the liquid trap 60 may be dependent on the fluid level in the extractor reservoir 86.

Figure 16:
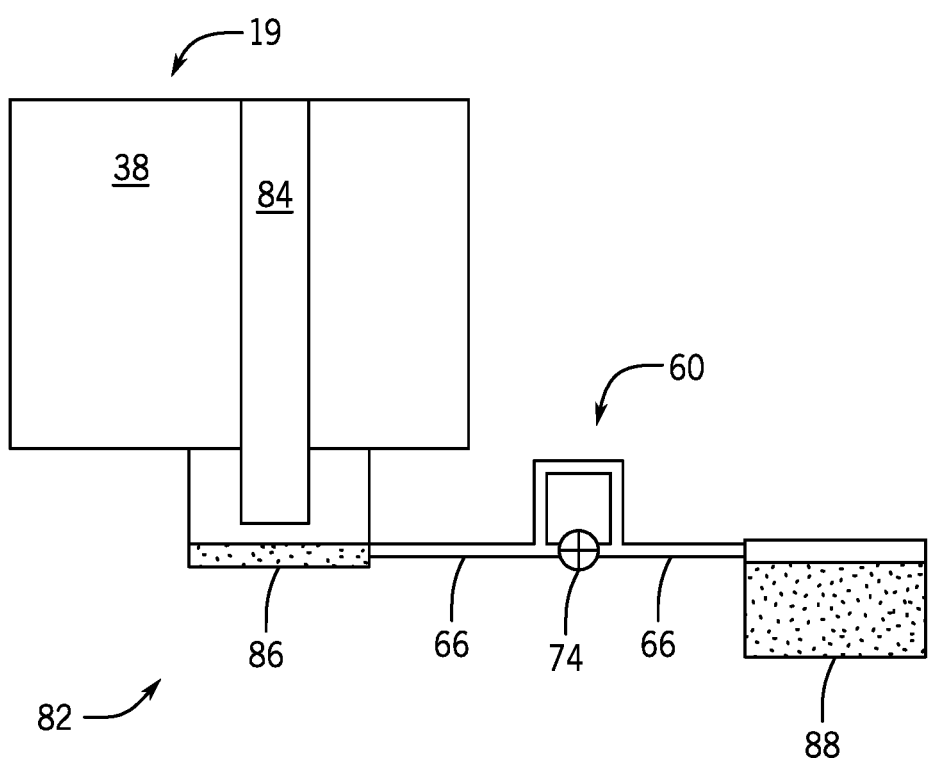
FIG. 16 is a schematic side view of the wind tunnel device of FIG. 10 during a third operating condition (e.g., wind speed) with a valve in the adjustable liquid trap opened for drainage of liquid waste from a reservoir to a waste container.

Referring to FIG. 16, the liquid trap 60 may allow for complete drainage of the reservoir 86 when the tunnel 19 is not operating. The valve 74 has been opened in FIG. 16 to allow direct fluid flow from the droplet extractor reservoir 86 into the waste container 88 when the tunnel 19 is not operating. As illustrated in FIG. 16, the fluid in the droplet extractor reservoir 86 has substantially completely drained into the waste container 88.

In use, air may be circulated through the wind tunnel 19 at a first wind speed, and the liquid trap 60 may be set at a first height in response to the first wind speed to inhibit backflow of fluid into the wind tunnel at the first wind speed. The wind speed may be adjusted to a second wind speed that is different from the first wind speed, and in response to the adjustment in wind speed the height of the liquid trap may be adjusted to a second height that is different from the first height to inhibit backflow of fluid into the wind tunnel at the second wind speed.

To set the liquid trap 60 at the first height, the liquid trap 60 may be rotated to an initial angular position relative to the drain line 66. To adjust the liquid trap 60 to the second height, the liquid trap 60 may be rotated to a different angular position relative to the drain line 66. In cases where the second wind speed is greater than the first wind speed, the second angular position is more upright than the first angular position such that the second height is greater than the first height.

Although the present disclosure provides references to preferred embodiments, persons skilled in the art will recognize that changes may be made in form and detail without departing from the spirit and scope of the invention. For example, although the adjustable liquid trap 60 is described in connection with wind tunnel device 10 illustrated in FIGS. 1-7, the liquid trap may be used with various wind tunnels, including the wind tunnel disclosed in U.S. patent application Ser. No. 15/701,143, filed concurrently with the present application, and entitled "Flow Diverting Wind Tunnel", the entire contents of which are hereby incorporated by reference herein for all purposes.

What is claimed is:

1. A system comprising:
   a wind tunnel; and a waste disposal unit fluidly connected to the wind tunnel and configured to capture fluid from the wind tunnel, wherein the waste disposal unit is adjustable to prevent backflow of captured fluid into the wind tunnel.

2. The system of claim 1, wherein the waste disposal unit includes an adjustable liquid trap that is adjustable.

3. The system of claim 2, wherein a height of the liquid trap is adjustable.

4. The system of claim 3, wherein:
the waste disposal unit includes an extraction reservoir configured to collect liquid from the wind tunnel,
the adjustable liquid trap is fluidly connected to the extraction reservoir opposite the wind tunnel, and
the height of the liquid trap is adjustable to match a fluid level of fluid collected by the extraction reservoir.

5. The system of claim 4, wherein:
the fluid collected by the extraction reservoir has a variable height across the extraction reservoir corresponding to a pressure differential in the wind tunnel during operation of the wind tunnel, and
the height of the liquid trap is adjustable by rotation of the liquid trap relative to a drain line.

6. The system of claim 2, wherein the adjustable liquid trap comprises:
a U-shaped trap portion, and
a bypass portion connected to ends of the U-shaped trap portion, wherein the bypass portion is in-line with a flow of fluid collected from the wind tunnel, and wherein the U-shaped trap portion is adjustable relative to the bypass portion.

7. The system of claim 6, wherein the U-shaped portion is rotatable relative to the bypass portion.

8. The system of claim 1, further comprising a droplet extractor positioned in the wind tunnel, wherein the waste disposal unit is configured to collected liquid from the wind tunnel via the droplet extractor.

9. A method of disposing waste from a wind tunnel, the method comprising:
circulating air through a wind tunnel;
capturing fluid from the wind tunnel using a waste disposal unit; and
adjusting a liquid trap of the waste disposal unit to prevent backflow of the captured fluid into the wind tunnel.

10. The method of claim 9, wherein the step of adjusting a liquid trap includes adjusting the liquid trap based on a speed of the air circulated through the wind tunnel.

11. The method of claim 10, wherein:
the step of circulating air through the wind tunnel further comprises:
circulating air through the wind tunnel at a first speed; and
circulating air through the wind tunnel at a second speed, and
the step of adjusting a liquid trap further comprises:
adjusting a height of the liquid trap to a first height in response to the first speed; and
adjusting the height of the liquid trap to a second height in response to the second speed.

12. The method of claim 11, wherein the step of adjusting a liquid trap further comprises rotating the liquid trap relative to a drain line from the first height to the second height.

13. The method of claim 9, wherein the step of capturing fluid from the wind tunnel comprises collecting liquid via a droplet extractor positioned in the wind tunnel, the waste disposal unit being arranged to receive liquid via the droplet extractor.

14. The method of claim 13, wherein:
the step of capturing fluid from the wind tunnel comprises receiving liquid in an extraction reservoir of the waste disposal unit, the liquid defining a fluid level within the extraction reservoir, the liquid trap fluidly connected to the extraction reservoir via a drain line, and
the step of adjusting a liquid trap of the waste disposal unit comprises adjusting a height of the liquid trap based on the fluid level.

15. The method of claim 14, wherein:
the liquid trap includes a bypass portion in-line with the drain line, and a U-shaped trap portion with ends coupled to the bypass portion, and
wherein the method includes manipulating a valve integrated with the bypass portion for drainage of the extraction reservoir.

16. A waste disposal unit for a wind tunnel, the waste disposal unit comprising:
an extraction reservoir arrangeable to collect liquid from the wind tunnel, wherein fluid collected from the wind tunnel establishes a fluid level in the extraction reservoir; and
an adjustable liquid trap fluidly connected to the extraction reservoir comprising a trap portion that is height adjustable to the fluid level, thereby inhibiting backflow of fluid downstream of the adjustable liquid trap.

17. The waste disposal unit of claim 16, wherein the adjustable liquid trap includes a U-shaped trap portion.

18. The waste disposal unit of claim 17, wherein the U-shaped trap portion is rotatable relative to a drain line of the extraction reservoir.

19. The waste disposal unit of claim 16, wherein:
the waste disposal unit further comprises a waste container arranged downstream of the extraction reservoir, and
the adjustable liquid trap is adjustable to inhibit egress of backflow of fluid held in the waste disposal unit.

20. The waste disposal unit of claim 16, wherein the adjustable liquid trap is height adjustable to accommodate different wind speeds of air circulating through the wind tunnel.

* * * * *